United States Patent (10) Patent No.: US 12,146,523 B2
Schuelke et al. (45) Date of Patent: Nov. 19, 2024

(54) TILTING PAD BEARING

(71) Applicant: Robert Bosch GmbH, Stuttgart (DE)

(72) Inventors: Armin Schuelke, Aidlingen (DE); Thomas Lang, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 121 days.

(21) Appl. No.: 17/923,630

(22) PCT Filed: Mar. 31, 2021

(86) PCT No.: PCT/EP2021/058413
§ 371 (c)(1),
(2) Date: Nov. 7, 2022

(87) PCT Pub. No.: WO2021/223943
PCT Pub. Date: Nov. 11, 2021

(65) Prior Publication Data
US 2023/0184287 A1 Jun. 15, 2023

(30) Foreign Application Priority Data

May 7, 2020 (DE) ...................... 10 2020 205 769.9

(51) Int. Cl.
F16C 17/03 (2006.01)
(52) U.S. Cl.
CPC .................... F16C 17/03 (2013.01)
(58) Field of Classification Search
CPC ...................................... F16C 17/03
See application file for complete search history.

(56) References Cited

U.S. PATENT DOCUMENTS 7,780,424 B2 * 8/2010 Parmeter ................. F16C 17/03
417/423.12
10,968,946 B2 * 4/2021 Doehring ................ F16C 17/03

FOREIGN PATENT DOCUMENTS

| DE | 102016216395 A1 | 3/2018 |
| EP | 0758058 A1 | 2/1997 |
| GB | 1174429 A | 12/1969 |
| JP | S49053144 U | 5/1974 |
| JP | S378655 B | 7/1980 |
| JP | S57145816 U | 9/1982 |

OTHER PUBLICATIONS

Translation of International Search Report for Application No. PCT/EP2021/058413 dated Jun. 21, 2021 (2 pages).

* cited by examiner

Primary Examiner — James Pilkington
(74) Attorney, Agent, or Firm — Michael Best & Friedrich LLP

(57) ABSTRACT

A tilting pad bearing (10) including tilting pads (1, 2, 3) retained and positioned so that the tilting pads can tilt in a housing body (8) with a frame-type spring unit (8), such that, during operation of the tilting pad bearing (10), converging bearing gaps are created between the tilting pads (1,2,3) and a rotor body (4) that is rotatably mounted about an axis of rotation. In order to improve the functioning and/or manufacturing of the tilting pad bearing (10), the tilting pad bearing (10) includes rolling elements (6, 7) arranged between the housing body (5) and the tilting pads (1,2, 3).

11 Claims, 3 Drawing Sheets

TILTING PAD BEARING

CROSS-REFERENCE TO RELATED APPLICATIONS

This application is a 371 of PCT/EP2021/058413 filed on Mar. 31, 2021, which claims priority to German Application No. 102020205769.9 filed on May 7, 2020, the entire content of which is incorporated herein by reference.

BACKGROUND OF THE INVENTION

The invention relates to a tilting pad bearing having tilting pads which are positioned and held so that they can tilt in a housing body by means of a frame-like spring device in order, during operation of the tilting pad bearing, to produce converging bearing gaps between the tilting pads and a rotor body mounted so as to be rotatable about an axis of rotation.

German Laid-Open Application DE 10 2016 216 395 A1 discloses a tilting pad bearing having: a sleeve, a plurality of tilting pads, and a frame, in which the tilting pads are accommodated, wherein a spring element is provided in each case between the inner side of the sleeve and the assigned tilting pad, wherein the spring element is connected to the frame or is arranged as a separate component between the inner side of the sleeve and the frame, wherein the frame has at least one holding section for holding the assigned tilting pad in the frame, wherein the respective tilting pad is held in the frame by the at least one holding section in such a way that the tilting pad has play in the radial direction and preferably additionally in the circumferential direction in order to permit tilting of the tilting pad in the circumferential direction.

SUMMARY OF THE INVENTION

It is the object of the invention to improve the functionality and/or production of a tilting pad bearing having tilting pads which are positioned and held so that they can tilt in a housing body by means of a frame-like spring device in order, during operation of the tilting pad bearing, to produce converging bearing gaps between the tilting pads and a rotor body mounted so as to be rotatable about an axis of rotation.

In the case of a tilting pad bearing having tilting pads which are positioned and held so that they can tilt in a housing body by means of a frame-like spring device in order, during operation of the tilting pad bearing, to produce converging bearing gaps between the tilting pads and a rotor body mounted so as to be rotatable about an axis of rotation, the object is achieved by rolling elements arranged between the housing body and the tilting pads. The rotor body is, for example, a shaft section of a shaft. In many fields of technology, there is a need to support high-speed shafts. Such shafts are required, for example, in turbocompressors of the kind used, in particular, for compressing air for pressure-charged internal combustion engines or for fuel cell systems. In this case, as a rule, further components are mounted on, in or against the shaft, for example turbine wheels, compressor wheels or magnets for electric drives. These likewise rotate at very high speed. The shafts can be of one- or multi-piece design. The shaft is preferably supported by a plurality of bearing units, for example two radial bearings and one axial bearing. The bearing units permit rotation with as little loss as possible when forces and torques act on the shaft during operation. Gas-lubricated bearings are advantageously used for support since, at very high rotational speeds, they have very low friction and thus only low bearing losses. Moreover, it is possible with a gas-lubricated bearing to dispense with oil or grease lubrication. This is advantageous particularly in fuel cell applications since in this case the compressor air delivered must be free from oil to avoid damaging a fuel cell stack. The tilting pad bearing advantageously comprises at least three tilting pads. As a particular preference, the tilting pad bearing comprises precisely three tilting pads. The claimed tilting pad bearing is preferably a radial bearing. The tilting pads are positioned and held relative to one another by the spring device in such a way that they can execute tilting movements which occur during operation of the tilting pad bearing. The tilting pads can be tilted about a so-called pivot point or a pivot axis or tilting axis. The rolling elements advantageously serve to allow the tilting movements of the tilting pads. By means of the rolling elements, the tilting pads are provided with radial point support or linear support in the radial bearing. The rolling elements are particularly advantageously standardized components, such as balls, rollers or needles, which are used in rolling bearings. These standardized rolling elements are available at low cost.

A preferred exemplary embodiment of the tilting pad bearing is characterized in that the rolling elements are embodied as rollers. The rollers preferably substantially have the shape of right circular cylinders whose cylinder axes are arranged parallel to the axis of rotation of the rotor body. Each tilting pad is advantageously assigned at least one rolling element. By means of the rollers, it is possible to achieve a defined tilting movement of the tilting pads in a simple manner during operation of the tilting pad bearing.

Another preferred exemplary embodiment of the tilting pad bearing is characterized in that the rolling elements are embodied as balls. Each tilting pad can be assigned a plurality of balls. The balls are then advantageously arranged parallel to the axis of rotation of the rotor body. According to a preferred exemplary embodiment, each tilting pad is assigned precisely one rolling element embodied as a ball. Among the advantages that this provides is that the assigned tilting pad can tilt not only about an axis parallel to the axis of rotation of the rotor body, which is also referred to as the shaft axis, but also relative to an axis orthogonal thereto. In this way, it is possible to compensate for angular misalignments of the rotor body or of the shaft or of a housing bore of a housing body, which are unwanted per se but are almost impossible to avoid in practice. In this exemplary embodiment, the tilting pads can advantageously be aligned with the axis of rotation or shaft axis.

Another preferred exemplary embodiment of the tilting pad bearing is characterized by a cage, which serves to hold the rolling elements in position between the housing body and the tilting pads. According to one exemplary embodiment, the cage serves only to hold the rolling elements in position between the housing body and the tilting pads. This has the advantage that the cage can be of relatively simple design and can thus be produced inexpensively. The cage allows the rolling elements to be preinstalled. The cage comprises at least one annular body, for example. The annular body need only have one through-hole per rolling element to accommodate the rolling elements. Depending on the embodiment, the spring device is also equipped with a corresponding through-hole. The through-holes serve, on the one hand, to position the rolling elements. In addition, the through-holes make it possible for the rolling elements to have both contact with the rotor element and contact with the housing element. In another exemplary embodiment, it is also possible to use only the spring device to position the rolling elements. The cage can then be eliminated.

Another preferred exemplary embodiment of the tilting pad bearing is characterized in that the cage has through-holes in which the rolling elements are accommodated with play in such a way that the rolling elements have rolling contact both with the housing body and with the respective tilting pad outside the through-holes. Depending on the embodiment, the spring device, or at least a part of the spring device, is still arranged radially between the cage and the rotor body or between the cage and the housing body. The spring device is then advantageously provided at the corresponding point with a through-hole which is coaxial with the corresponding through-hole in the cage. By means of the cage, the rolling elements can be held in a simple and stable manner in their desired position between the rotor body and the housing body.

Another preferred exemplary embodiment of the tilting pad bearing is characterized in that the cage comprises at least one simple annular body. The annular body has, for example, the shape of a circular ring with a rectangular ring cross section. This simplifies the production of the annular body. The shape of the through-holes in the annular body is advantageously matched substantially to the shape of the rolling elements. The cage can also comprise two annular bodies. Depending on the embodiment, the annular bodies can also be connected to one another by webs.

Another preferred exemplary embodiment of the tilting pad bearing is characterized in that the tilting pads are each assigned a spring element in order to position and hold the assigned tilting pad so that it can tilt in the housing body. In this exemplary embodiment, the spring device advantageously comprises precisely one spring element per tilting pad. This simplifies the production of the spring device. The spring elements advantageously comprise a holding section at each of their ends which are opposite in the circumferential direction, by means of which holding section the respective spring element fits around the assigned tilting pad. According to another exemplary embodiment or another feature, the cage, both in its one-piece design with just one annular body and in its two-piece design with two annular bodies, advantageously also serves to position the spring elements, at least in the axial direction, in the tilting pad bearing.

Another preferred exemplary embodiment of the tilting pad bearing is characterized in that the spring element fits around the assigned tilting pad at its ends which are opposite in the circumferential direction. For this purpose, the spring element can have precisely one holding section at its ends which are opposite in the circumferential direction. However, the spring element can also be equipped with a plurality of holding sections at its opposite ends. This gives more freedom of design in the implementation of the spring device and/or of the cage.

Another preferred exemplary embodiment of the tilting pad bearing is characterized in that the spring element comprises at least one spring tab, which is biased inward against the assigned tilting pad. The spring tab advantageously extends through a through-hole, which is provided for this purpose in the cage. Alternatively or additionally, the spring element can have an additional spring tab, which is biased against the housing body. The spring elements with the spring tabs hold and position the tilting pads and advantageously bias them with the aid of the spring tabs, thus ensuring that, when the rotor body is not rotating, the tilting pads are pressed against the rotor body on one side.

The invention furthermore relates to a cage, a tilting pad, a spring element, a housing body and/or a rolling element for a tilting pad bearing as described above. The parts mentioned can be handled separately.

Further advantages, features and details of the invention will be found in the following description, in which various exemplary embodiments are described in detail with reference to the drawing.

DETAILED DESCRIPTION

FIGS. 1 to 5 show a tilting pad bearing 10 schematically and in perspective in various exemplary embodiments. The same reference signs are used in FIGS. 1 to 5 to designate identical or similar parts. First, the common features of the individual exemplary embodiments will be discussed. After this, the differences between the individual exemplary embodiments are explained.

The tilting pad bearing 10 is embodied as a radial bearing with three tilting pads 1, 2, 3. A rotor body 4 is mounted radially inside the tilting pads 1, 2, 3 so as to be rotatable about an axis of rotation. The rotor body 4 is, for example, a shaft or a shaft section having a shaft.

Figure 1:
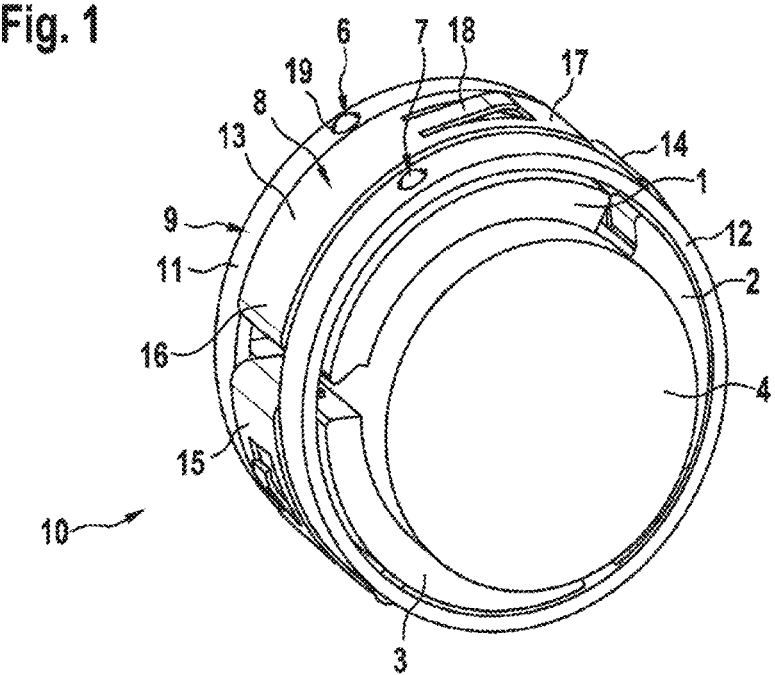
FIG. 1 shows a perspective illustration of a tilting pad bearing having three tilting pads, each of which is assigned two spherical rolling elements.

The tilting pads 1, 2, 3 can each be tilted about a pivot point or a tilting axis or pivot axis with the aid of rolling elements 6, 7; 20; 24; 44. In FIG. 1, two rolling elements 6, 7, which are embodied as balls, are assigned to each tilting pad 1 to 3. In FIGS. 2 to 5, each tilting pad 1 to 3 is assigned precisely one rolling element 20; 24; 44. The rolling elements 20 are embodied as balls. The rolling elements 24; 44 are embodied as rollers.

The tilting pads 1 to 3 are positioned and held relative to one another and to the rotor body 4 within a housing body (5 in FIG. 5) by a spring device 8. The spring device 8 is combined with a cage 9.

In FIG. 1, the cage 9 comprises two annular bodies 11, 12. The spring device 8 comprises three spring elements 13, 14, 15. Each spring element 13, 14, 15 is assigned precisely one tilting pad 1, 2, 3.

The spring elements 13, 14, 15 are arranged between the two annular bodies 11, 12 in the axial direction. The spring elements 13, 14, 15, the tilting pads 1, 2, 3 and the annular bodies 11, 12 are each of the same design. In addition, the abovementioned individual parts are of simple construction and can thus be produced inexpensively.

The spring element 13 comprises a holding section 16, 17 at each of its ends which are opposite in the circumferential direction. The spring element 13 fits around the assigned tilting pad 1 by means of the holding sections 16, 17. The spring element 13 is positioned between the two annular bodies 11, 12 in the axial direction. In addition, the spring element 13 has a spring tab 18, which is biased radially outward against the housing body (5 in FIG. 5).

The annular bodies 11, 12 each comprise a through-hole 19 for accommodating a rolling element 6, 7 embodied as a ball. The ball 6 is accommodated with play in the through-hole 19, which is embodied, for example, as an elongate hole.

The tilting pads 1 to 3 illustrated have an inside diameter and an outside diameter. As a departure from the illustration, the tilting pads 1 to 3 can also assume virtually any desired shape. If they are embodied as ring segments, for example, the tilting pads 1 to 3 can be produced inexpensively by dividing up a ring.

Figure 2:
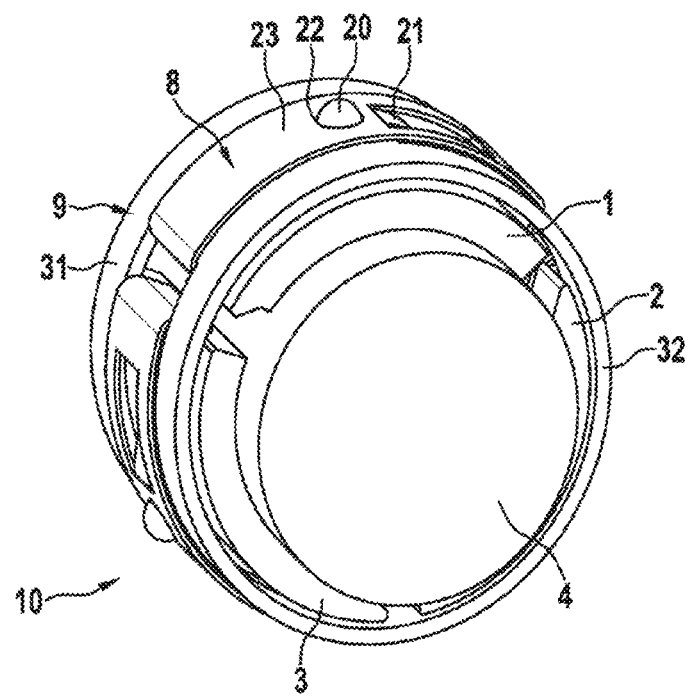
FIG. 2 shows an illustration similar to that in FIG. 1, each tilting pad being assigned a spherical rolling element.

In FIG. 2, each of the tilting pads 1 to 3 is assigned a rolling element 20 embodied as a ball. A spring element 23 assigned to the tilting pad 1 comprises a through-hole 22, in which the ball 20 is accommodated with play. The through-hole 22 is of circular design. In addition, the spring element 23 has a spring tab 21, which in FIG. 2 is biased radially inward against the rotor body 4.

Figure 3:
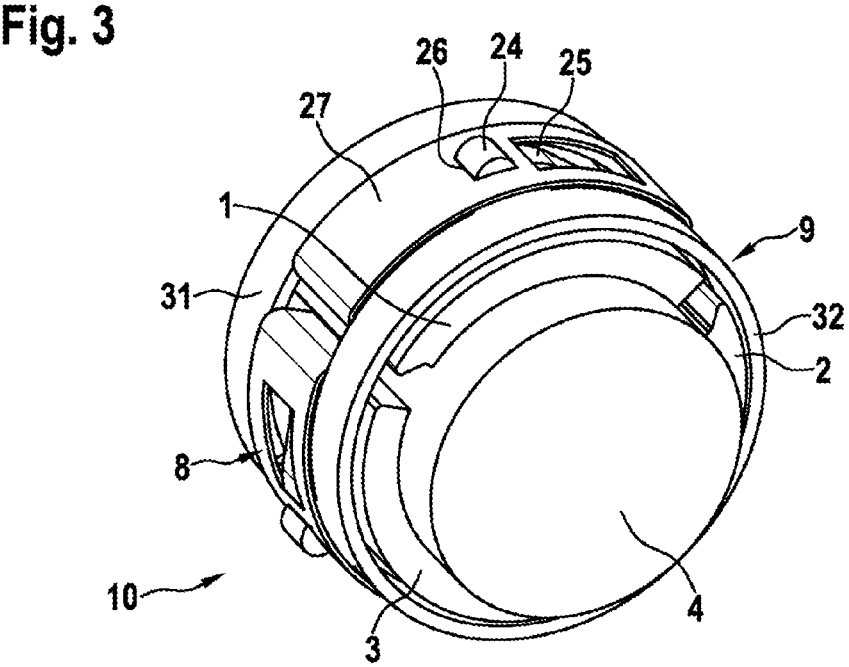
FIG. 3 shows an illustration similar to that in FIG. 2, each tilting pad being assigned a roller-shaped rolling element.

The cage 9 comprises two annular bodies 31, 32, which, in the exemplary embodiments illustrated in FIGS. 2 and 3, serve only to position the spring elements 23; 27 in the axial direction. In contrast to the annular bodies 11, 12 in FIG. 1, the annular bodies 31, 32 are not provided with through-holes (19 in FIG. 1) for the rolling elements.

In FIG. 3, a rolling element 24 embodied as a roller is arranged in a through-hole 26 of a spring element 27, which is assigned to the tilting pad 1. As in the exemplary embodiment illustrated in FIG. 2, a spring tab 25 is biased radially inward against the rotor body 4. The arrangement of the spring tab 25 in the vicinity of the rolling element 24 provides the advantage, inter alia, that the rolling element 24 is advantageously used for aligning or positioning the spring device 8 and the cage 9.

Figure 4:
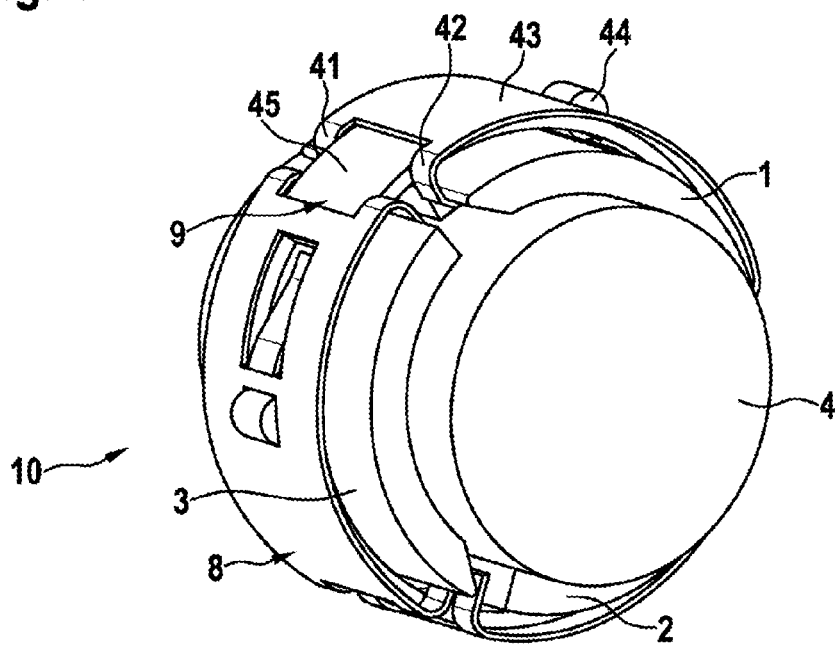
FIG. 4 shows an illustration similar to that in FIG. 3 with a cage comprising only one annular body.
Figure 5:
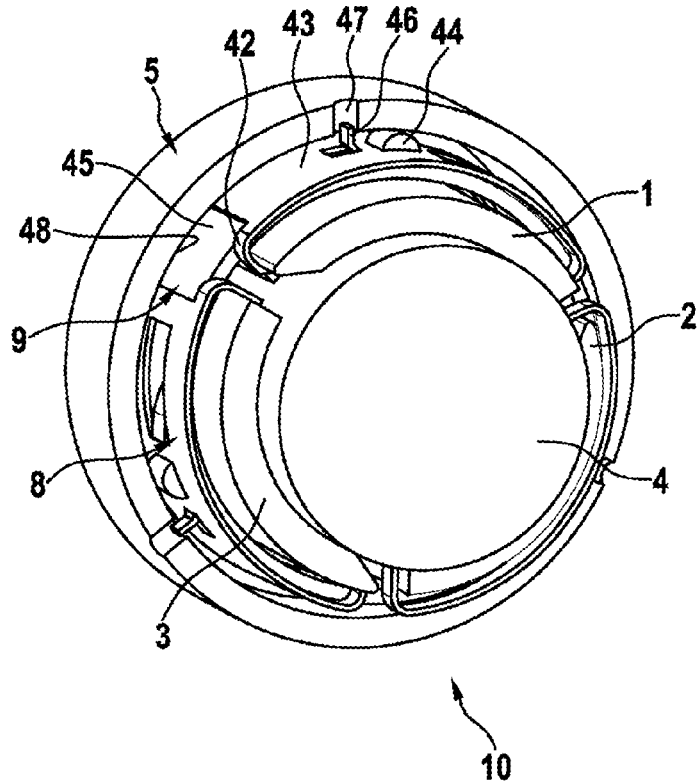
FIG. 5 shows the tilting pad bearing from FIG. 4 with a housing body shown in half-section.

In the exemplary embodiment illustrated in FIGS. 4 and 5, the cage 9 comprises only one annular body 45. The annular body 45 is arranged centrally in the axial direction with respect to the tilting pad bearing 10. In contrast to the preceding exemplary embodiments, the spring elements 43 are provided with two holding sections 41, 42 at each circumferential end. The spring element 43 fits around the tilting pad 1 at its circumferential end, which is visible in FIG. 1, by means of the holding sections 41, 42. The holding sections 41, 42 are arranged axially adjacent to the annular body 45 arranged therebetween.

FIG. 5 illustrates in perspective the tilting pad bearing 10 from FIG. 4 together with a housing body 5 illustrated in half-section. The housing body 5 comprises a housing bore 48, in which the tilting pad bearing 10 is accommodated. A positioning tab 46 is angled radially outward from the spring element 43.

The positioning tab 46 engages in a through-hole 47, which is provided in the housing body 5 for this purpose. Adjacent to the positioning tab 46, the spring element 43 comprises a through-hole (not designated) for the rolling element 44. A corresponding through-hole is provided for the rolling element 44 in the annular body 45, which is arranged radially between the tilting pad 1 and the spring element 43.

The positioning tab 46 serves to form an anti-rotation device in the housing bore 48 of the housing body 5. As a departure from the illustration, the positioning tab 46 can also engage in a corresponding groove or recess in the housing body 5.

Figure 6:
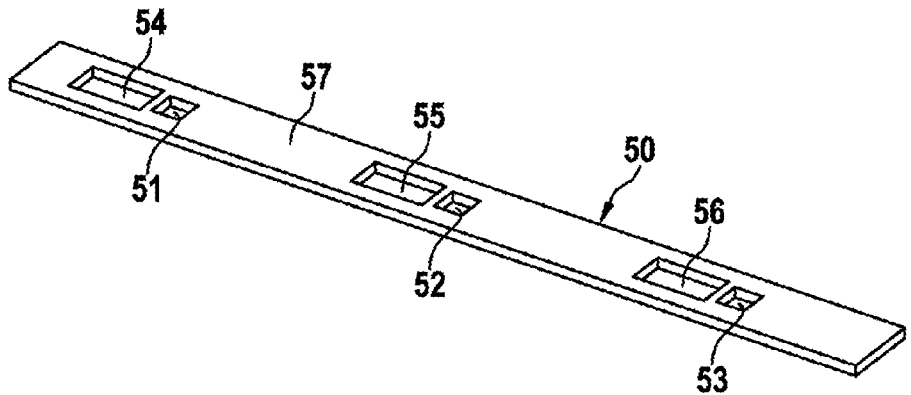
FIG. 6 shows a perspective illustration of a sheet metal strip which can advantageously be used to produce a cage for rolling elements of a tilting pad bearing of the kind illustrated in FIG. 5.

FIG. 6 shows how the annular body (45 in FIG. 5) can be produced inexpensively from a sheet-metal strip 57 in a simple manner. The sheet-metal strip 57 comprises through-holes 51 to 53 and 54 to 56, which can be produced in the sheet-metal strip 57 by punching, for example. The through-holes 51 to 53 each serve to accommodate a rolling element (44 in FIG. 5).

The through-holes 54 to 56 serve for the passage of spring tabs which start from the spring elements of the spring device (8 in FIG. 5) and are biased against the rotor body (4 in FIG. 5). The sheet-metal strip 57 with the through-holes 51 to 56 can also be considered as a development 50 or as an intermediate product during the production of the annular body (45 in FIG. 5).

What is claimed is:

1. A tilting pad bearing (10) comprising tilting pads (1, 2, 3), which are positioned and held so that the tilting pads can tilt in a housing body (5) by a spring device (8) in order, during operation of the tilting pad bearing (10), to produce converging bearing gaps between the tilting pads (1, 2, 3) and a rotor body (4) mounted so as to be rotatable about an axis of rotation, wherein rolling elements (6, 7; 20; 24; 44) are arranged between the housing body (5) and the tilting pads (1, 2, 3), the tilting pad bearing (10) further including a cage (9) which serves to hold the rolling elements (6, 7; 20) in position between the housing body (5) and the tilting pads (1, 2, 3), wherein the cage (9) has through-holes (19; 26; 51-52) in which the rolling elements (6, 7; 20; 24; 44) are accommodated with play in such a way that the rolling elements (6, 7; 20; 24; 44) have rolling contact both with the housing body (5) and with a respective tilting pad (1, 2, 3) outside the through-holes (19; 26; 51-52).

2. The tilting pad bearing as claimed in claim 1, wherein the rolling elements (24; 44) are embodied as rollers.

3. The tilting pad bearing as claimed in claim 1, wherein the rolling elements (6, 6; 20) are embodied as balls.

4. The tilting pad bearing as claimed in claim 1, wherein the cage (9) comprises at least one annular body (11, 12; 31, 32; 45).

5. The tilting pad bearing as claimed in claim 1, wherein the tilting pads (1, 2, 3) are each assigned a respective spring element (13, 14, 15; 23; 27; 43) in order to position and hold a respective tilting pad (1, 2, 3) so that the respective tilting pad can tilt in the housing body (5).

6. The tilting pad bearing as claimed in claim 5, wherein the respective spring element (13, 14, 15; 23; 27; 43) fits around the respective tilting pad (1, 2, 3) at ends which are opposite in a circumferential direction.

7. The tilting pad bearing as claimed in claim 6, wherein the respective spring element (23; 43) comprises at least one spring tab (21; 25), which is biased inward against the respective tilting pad (1).

8. The tilting pad bearing as claimed in claim 5, wherein the respective spring element (23; 43) comprises at least one spring tab (21; 25), which is biased inward against the respective tilting pad (1).

9. A tilting pad bearing (10) comprising tilting pads (1, 2, 3), which are positioned and held so that the tilting pads can tilt in a housing body (5) by a spring device (8) in order, during operation of the tilting pad bearing (10), to produce converging bearing gaps between the tilting pads (1, 2, 3) and a rotor body (4) mounted so as to be rotatable about an axis of rotation, wherein rolling elements (6, 7; 20; 24; 44) are arranged between the housing body (5) and the tilting pads (1, 2, 3), wherein the tilting pads (1, 2, 3) are each assigned a respective spring element (13, 14, 15; 23; 27; 43) in order to position and hold a respective tilting pad (1, 2, 3)

so that the respective tilting pad can tilt in the housing body (5), wherein the respective spring element (13, 14, 15; 23; 27; 43) fits around the respective tilting pad (1, 2, 3) at ends which are opposite in a circumferential direction.

10. The tilting pad bearing as claimed in claim 9, wherein the respective spring element (23; 43) comprises at least one spring tab (21; 25), which is biased inward against the respective tilting pad (1).

11. A tilting pad bearing (10) comprising tilting pads (1, 2, 3), which are positioned and held so that the tilting pads can tilt in a housing body (5) by a spring device (8) in order, during operation of the tilting pad bearing (10), to produce converging bearing gaps between the tilting pads (1, 2, 3) and a rotor body (4) mounted so as to be rotatable about an axis of rotation, wherein rolling elements (6, 7; 20; 24; 44) are arranged between the housing body (5) and the tilting pads (1, 2, 3), wherein the tilting pads (1, 2, 3) are each assigned a respective spring element (13, 14, 15; 23; 27; 43) in order to position and hold a respective tilting pad (1, 2, 3) so that the respective tilting pad can tilt in the housing body (5), wherein the respective spring element (23; 43) comprises at least one spring tab (21; 25), which is biased inward against the respective tilting pad (1).

* * * * *